United States Patent [19]

Otte et al.

[11] 3,845,569

[45] Nov. 5, 1974

[54] BORE HOLE LOGGING DEVICE

[75] Inventors: Hubert Josef Otte; Gosta Roosman, both of Toronto, Ontario, Canada

[73] Assignee: Selco Mining Corporation Limited

[22] Filed: Feb. 9, 1972

[21] Appl. No.: 224,861

[52] U.S. Cl. .............................................. 33/312
[51] Int. Cl. ...... G01c 19/28, G01c 9/06, G01c 9/16
[58] Field of Search .............................. 33/312, 313

[56] References Cited
UNITED STATES PATENTS

| | | | |
|---|---|---|---|
| 963,242 | 7/1910 | Osterberg | 33/313 |
| 1,868,833 | 7/1932 | Hester | 33/312 |
| 2,746,162 | 5/1956 | Picard | 33/312 |
| 3,693,142 | 9/1972 | Jones | 33/308 X |

Primary Examiner—Louis R. Prince
Assistant Examiner—Charles E. Phillips

[57] ABSTRACT

A bore hole logging device employing an inclination pendulum device, and means for electrically sensing the position of the pendulum device, such pendulum device and sensing means being mounted on a freely rotatable housing or platform within the instrument which is weighted to adopt a constant uniform orientation within the bore hole. A further form of the invention may incorporate an additional reference pendulum to determine any deviations of the movable platform. A further form of the invention will incorporate a gyroscopic device also mounted on the rotatable housing or platform, and means for electrically sensing deviations between the azimuth bearing of the gyroscopic device and the azimuth bearing of the instrument.

16 Claims, 13 Drawing Figures

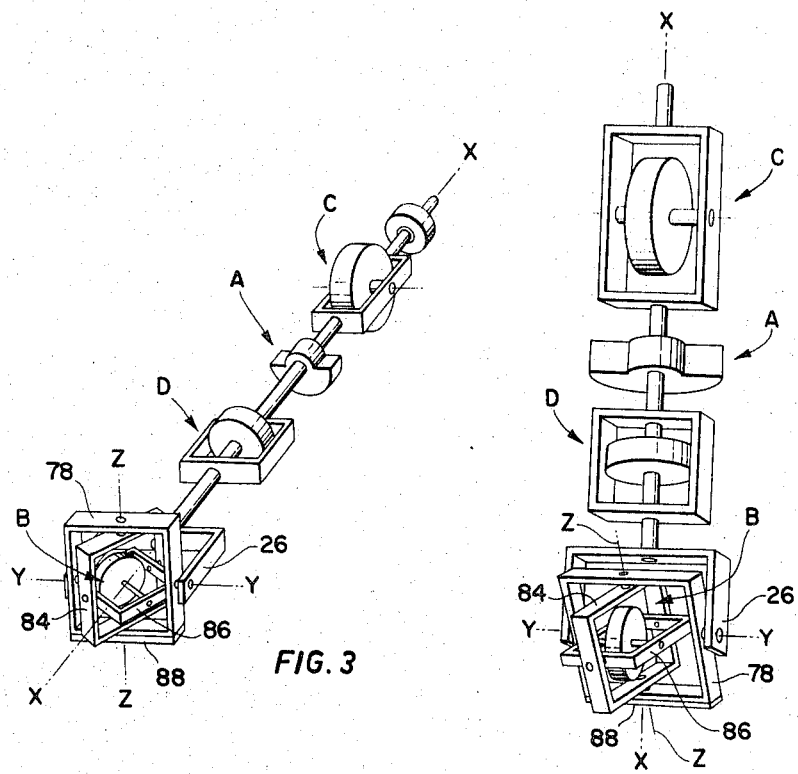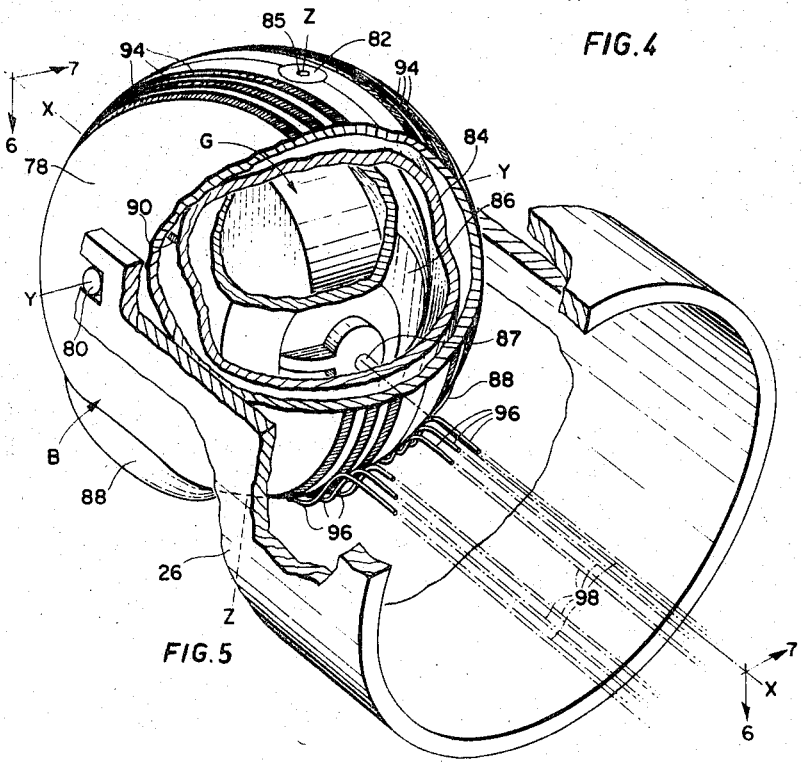

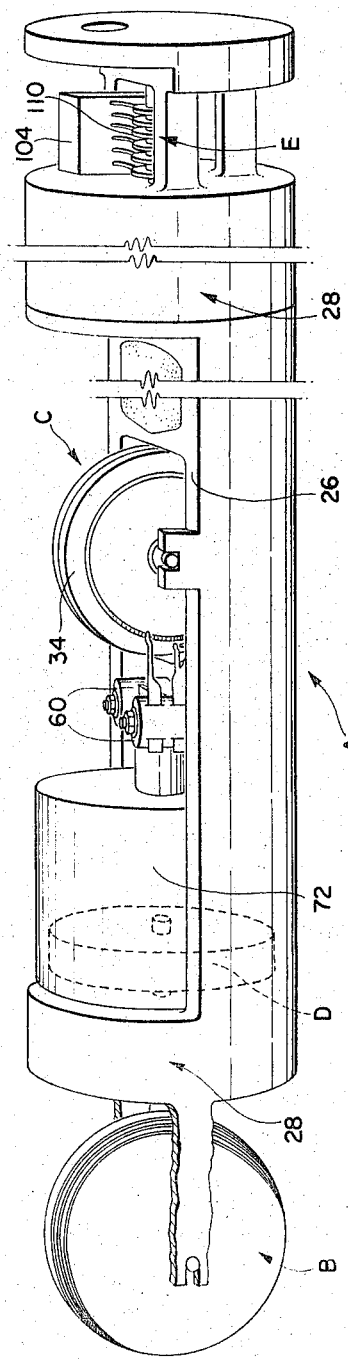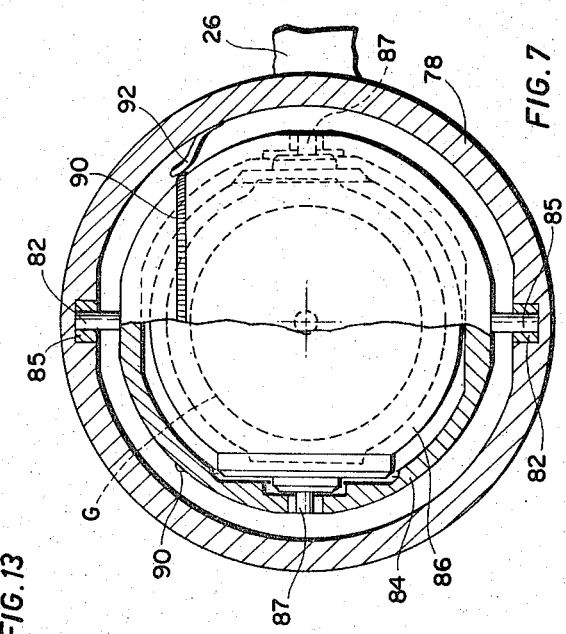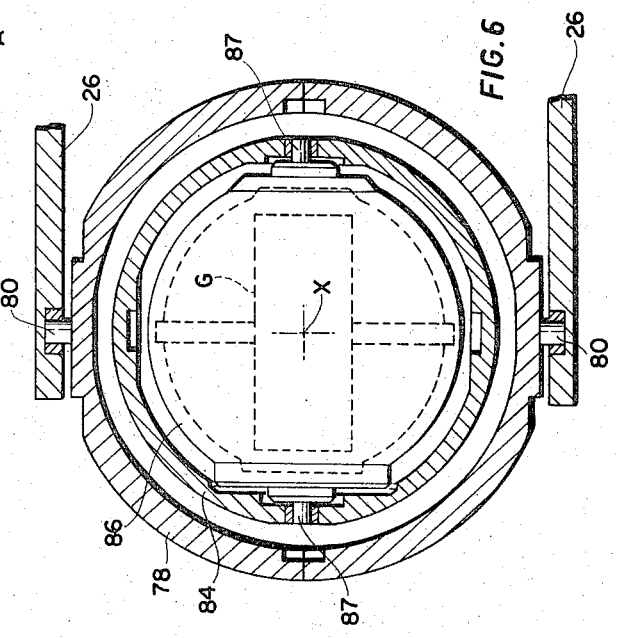

BORE HOLE LOGGING DEVICE

The present invention relates to an instrument for determining the inclination and azimuth of a bore hole.

BACKGROUND OF THE INVENTION

A variety of different devices have been proposed in the prior art for logging the inclination and azimuth of bore holes. All of these instruments are of course directed towards providing two pieces of information about the bore holes, namely, the inclination of the bore hole from the vertical, and the azimuth or compass heading of the bore hole. Obviously, the two pieces of information will have to be determined at spaced intervals down the bore hole, so that the determination of the depth of the instrument at a time when a reading is taken is a third factor which must be taken into account. However, in the vast majority of such prior art devices, this third piece of information was determined simply by measuring the cable upon which the instrument was lowered into the bore hole.

In order to measure the azimuth of a bore hole, prior art devices have employed the use of a simple compass card, or a gyroscopic device of some kind. Readings of the compass card have been proposed in various ways, including a purely mechanical marking device punching a hole in a compass card, for example, has been proposed in one case and in another case a photographic method has been proposed and in another case a mechanical gripping device has been employed which, after a predetermined free swinging period, is adapted to grip the compass card and hole it in position. All of these relatively crude devices however have meant that the instrument must be lowered down the bore hole and hoisted up again to the surface for each reading that it taken. Thus the logging of a complete bore hole down to many thousands of feet into the earth would be a very time consuming operation. During this logging operation, the drilling rig, and the drilling crew were of course out of use and many valuable hours of working time were wasted while the logging operation took place.

Other prior art devices have been proposed employing gyroscopes, mounted in some form of gimbal-like device. However, it was of course necessary to sense any movement of the instrument itself with reference to the gyroscope, and since such movement would be the very nature of the operation be a combination of a change of inclination and a change in azimuth, the sensing of any such movement between the gyroscope and the instrument itself was a matter of some complexity, and involved the creation of a good deal of friction. As a result, the gyroscopes employed in these types of instruments have to be relatively massive so as to provide sufficient inertia to overcome such friction and as a result, they could only be employed in relatively large diameter instruments which inturn had only a relatively limited application.

In practice, it is found that the greatest requirement for logging bore holes is in the smallest conventional drilling diameter, and so-called A core such as is used in exploratory drilling, and in the narrower drilling diameters gyroscopic devices were of little or no use for the reasons given above.

In order to sense the inclination of the instrument in the bore hole, the vast majority of prior art devices have employed some form of pendulum or plumb bob. Again as in the case of the compass card type devices many such prior art devices employing pendulums also employing some form of mechanical gripping device to hole the pendulum in the position it adopted at a particular location in the bore hole afterwhich the instrument was withdrawn from the hole, the inclination of the pendulum was observed and it was then allowed to swing free again while the instrument was lowered to a new depth and a new reading taken. In one such instrument for example the mechanical gripping of the pendulum and the mechanical gripping of the compass card was achieved by the same mechanism. In another example, two such pendulums were used with their swing axes located at right angles. In another example, a single free swinging plumb bob is used, i.e., a pendulum free to swing in any direction and not swinging about a predetermined axis, and in this case, the position of the plumb bob was sensed by surrounding it with four separate magnetic coils, and the position of the plumb bob was thus located. Generally speaking, prior art devices of the type employing only a single pendulum swinging about a single predetermined axis were subject to considerable inaccuracies, and the inaccuracies tended to vary depending upon the inclination of the instrument away from the vertical. On the other hand instruments employing more than one pendulum, or a free swinging plumb bob device, immediately became much more complex and it was almost impossible to sense accurately the position of the plumb bob or pendulums at any given time.

Again, as has been mentioned above, the use of pendulums in instruments designed for logging bore holes of the smaller diameters created considerable problems. Since the diameter of the hole is about 2 inches or even less in some cases, the instrument itself, after allowing for sufficient thickness for the casing cannot have a greater interior diameter than about 1½ inches at the most. Such a diameter means that either the pendulum must be very short or alternatively the pendulum will only swing through a very small arc and the instrument will thus be useless for bore holes drilled deliverately at an angle through a deposit. However, where the pendulum is very short then of course the effect of friction on the accuracy of the pendulum becomes very much greater. Any friction in either the pendulum mounting or in the pendulum sensing mechanism will tend to damp down the oscillations of the pendulum and it will never give an accurate reading when it comes to rest.

BRIEF SUMMARY OF THE INVENTION

The present invention seeks to provide a bore hole logging device employing a pendulum means for determining the inclination mounted on a freely rotatable frame or housing within an overall instrument diameter suitable for use in the narrowest sizes of bore holes, which housing is itself weighted to adopt a constant uniform orientation within the bore hole, and sensing means for sensing the position of the pendulum and thereby sensing the inclination of the instrument within the bore hole, such sensing means providing some form of electrical signals which can readily be monitored from the surface without the requirement for raising and lowering the instrument. The instrument may and preferably will include a gyroscopic device for determining azimuth and include separate sensing means for sensing the relative movement of the instrument, and thereby determining the azimuth of the instrument and in which both the gyroscopic device and the pendulum means are both mounted on the housing which is freely rotatable within the instrument independently of the instrument and regardless of movement of the exterior casing of the instrument, thereby overcoming substantial friction both in the operation of the gyroscopic device, and also in the pendulum means.

More particularly, the invention seeks to provide an instrument having the foregoing advantages in which the gyroscopic device is mounted in a triple gimbals, which gimbals is inturn mounted on the rotatable housing, thereby permitting the gyroscopic device to swing freely and independently of the movement of the casing.

More particularly, it is an objective of the present invention to provide an instrument having a gyroscopic device mounted in a triple gimbals, with an intermediate gimbals ring which is weighted to adopt a predetermined reference orientation due to gravity, regardless of movement of the inner housing or outer casing of the instrument.

More particularly, it is an objective of the present invention to provide an instrument having the foregoing advantages in which the sensing of the position of the pendulum is achieved by movable sensing means which are movable into and out of contact with the pendulum whereby to leave the pendulum completely free of contact of any sensing means during oscillation thereof.

More particularly, it is an objective of the present invention to provide an instrument having the foregoing advantages which is provided with a pendulum having an arcuate electrical sensing means, thereby permitting the pendulum to swing freely through 180°, the sensing means being capable of sensing the position of the pendulum at any such point in its movement.

More particularly it is an objective of the invention to provide an instrument having the foregoing advantages which is provided with an additional free pendulum swinging about the axis of the freely rotatable housing, and means for sensing the position of the pendulum.

The foregoing and other objectives of the invention will become apparent from the following description of a preferred embodiment which is given here by way of example only with reference to the following drawings in which like reference devices refer to like parts thereof.

BRIEF DESCRIPTION OF THE DRAWINGS

FIG. 3 is a schematic illustration showing a perspective illustration of the layout of the moving parts of the device shown in FIG. 2;

FIG. 4 is another schematic perspective illustration showing the layout of the moving parts when the device is in an almost vertical orientation;

FIG. 5 is a broken apart perspective illustration of the gyro portion of the device;

FIG. 6 is a sectional plan view of the gyro unit along the line 6—6 of FIG. 5;

FIG. 7 is a sectional elevational view of the gyro unit along the line 7—7 of FIG. 5;

FIG. 13 is a perspective illustration of the gyro unit, both pendulums, the slip ring and their carrier frame shown without the housing.

DETAILED DESCRIPTION OF A PREFERRED EMBODIMENT

Figure 1:
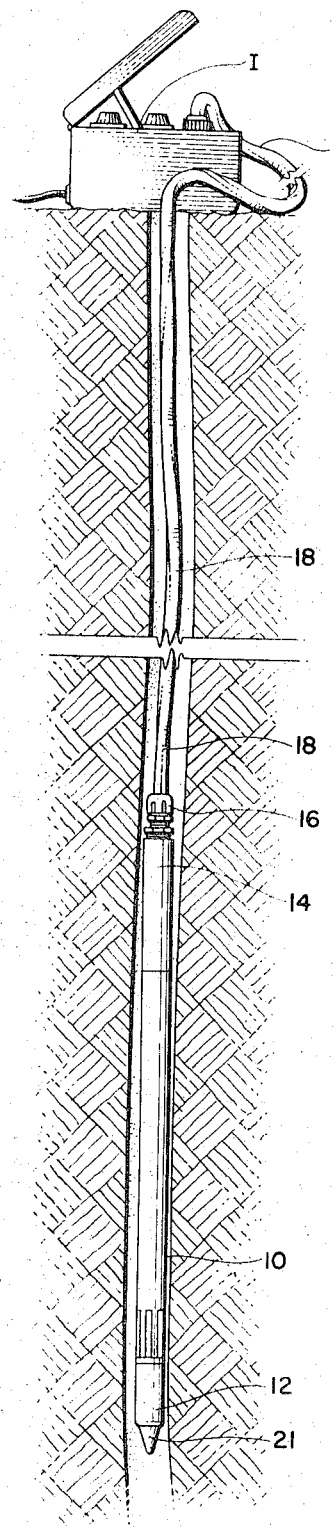
FIG. 1 is a schematic sectional illustration through an ore body, or portion of the earths crust through which a bore hole has been drilled and showing the logging device down the drill hole.
Figure 2:
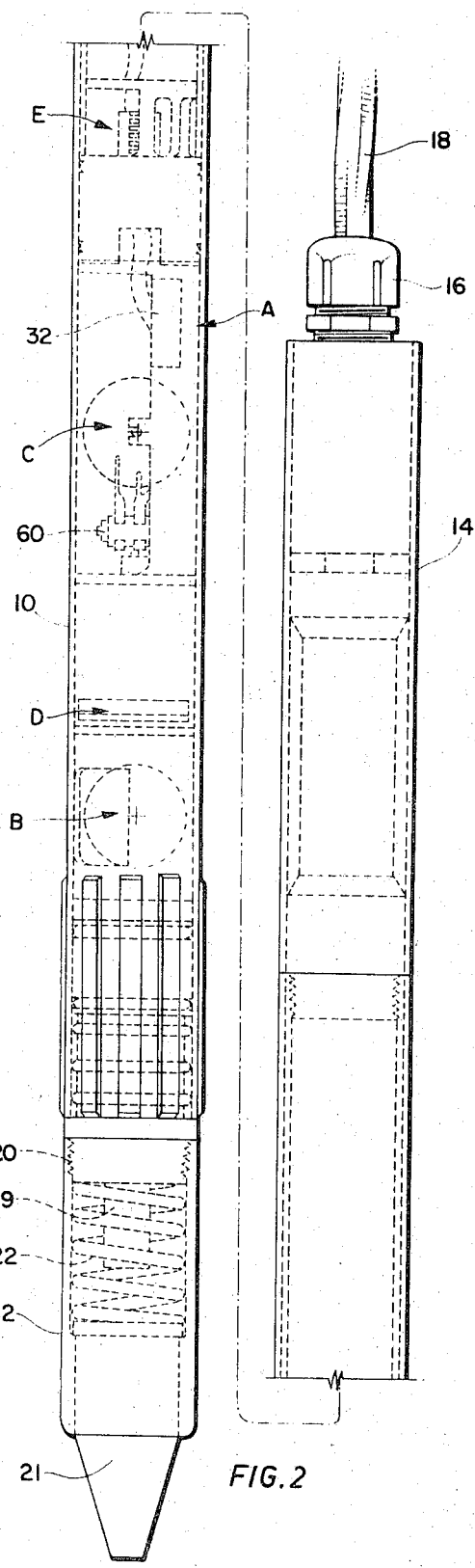
FIG. 2 is an enlarged schematic side elevational view of the device, showing the interior thereof in phantom, the two halves of the device having been separated and being shown side by side for the sake of clarity.

Referring now to FIGS. 1 and 2, it will be seen that this preferred embodiment of the invention comprises a cylindrical outer casing or main body 10, having an exterior, of a diameter less than the diameter of the standard A core bore hole, i.e., preferably in the region of about 2 inches or less. The device has a lower end 12, and an upper end 14 provided with a cable attachment means 16, and an electrical cable 18.

Clearly, the attachment means will be strong enough to permit hoisting by means of cable 18 and the electrical cable may be connected to a suitable power operated hoist and storage drum (not shown) the electrical cable 18 being marked at intervals to indicate the depth of the device in the bore hole. The electrical cable 18 may be itself connected to any suitable form of electrical instrumentation I giving a read-out in any suitable manner such as for example simply on dials on such instrumentation, or if desired on a recording tape, or on for example a continuous paper web recorder wherein readings are recorded visually either by a pen or electrical stylus or the like. Clearly, such electrical instrumentation and recording means are well known in the art and require no further description and are omitted from this specification for the sake of clarity. If desired, some even more complex form of read-out mechanism such as a digital read-out either giving a visual recording in numerical form, or even printing such a numerical determination on a tape, could also be employed although of course the overall cost of the instrument would then be incrased. For the purposes of this invention however any and all such electrical instrumentation that may be employed at the surface either to give a visual reading, or to make a permanent record or a magnetic record or indeed any form of record at all of readings taken in the bore hole, are deemed to be included within the general description of the terminology electrical instrumentation of instrumentation as the same may appear herein.

Within the lower end 12, there may be provided any suitable form of hermetic sealing means such as valve 19, the lower end 12 being attached to the main body 10 of the device by theaded means 20. A cone-shaped buffer member 21 is movable within lower end 12 and is normally extended by the spring 22. The upper end 14 of the device which is again detachable from the main body 10 contains an electrical power pack, a suitable timing mechanism and automatic relays, and signal amplifiers the details of which are not described, and are essentially of an auxiliary nature, the principal components of the device being contained within the main body 10.

Within the main body 10 there are four basic movable components, all of which are capable of movement independently of one another in predetermined planes. These components are (A) the self- levelling carrier frame, (B) the gyroscope unit, (C) the inclination pendulum unit, and (D) the reference pendulum unit. Referring now to FIGS. 3 and 4, these four components are shown in purely schematic form, merely for the purposes of understanding the layout and operation of the device as a whole, the various components being shown in detail in FIG. 13 and the remaining illustrations.

In order to convey electrical signals to and from the components A, B, C and D, a slip ring contact assembly E is provided at the upper end of the carrier frame assembly A.

Reduced to their most elementary characteristics, the self-levelling carrier frame A consists of for the most part a more or less semi-cylindrical platform, which is rotatably mounted within the main body 10 and is weighted to adopt a predetermined reference location at least so long as the axis of the device is tilted any appreciable degree out of the vertical. The axis of the device is shown in FIGS. 3 and 4 by the longitudinal axis X. The gyroscope unit B is mounted within a triple gimbal so as to leave it entirely free to swing in any direction, the outer most gimbals being inturn carried by the self- levelling carrier frame A, whereby the outermost gimbals of the gyroscope unit B will always lie with its transverse axis marked Y in the horizontal plane. The advantages of this arrangement will become apparent later, but it is sufficient to say that in this way it is only necessary for the gyroscope unit to determine any deviation about the X axis, i.e., to determine the azimuth of the bore hole. The inclination pendulum unit C is mounted within the self-aligning carrier frame A, with its swing axis parallel to the Y axis, that is to say, it will normally be horizontal due to the self-aligning effect of the carrier frame A. In this way, the inclination pendulum unit C will always indicate the maximum deviation of the axis X away from the vertical, i.e., it will not give false inclination readings, at least so long as the device is tilted any appreciable degree out of the vertical. The reference pendulum unit D is an additional supplementary free pendulum which is again mounted within the self-levelling carrier frame A and is free to swing about the X axis, independently of the swing of the self-levelling carrier frame A. The purposes of this arrangement will become apparent later.

Figure 8:
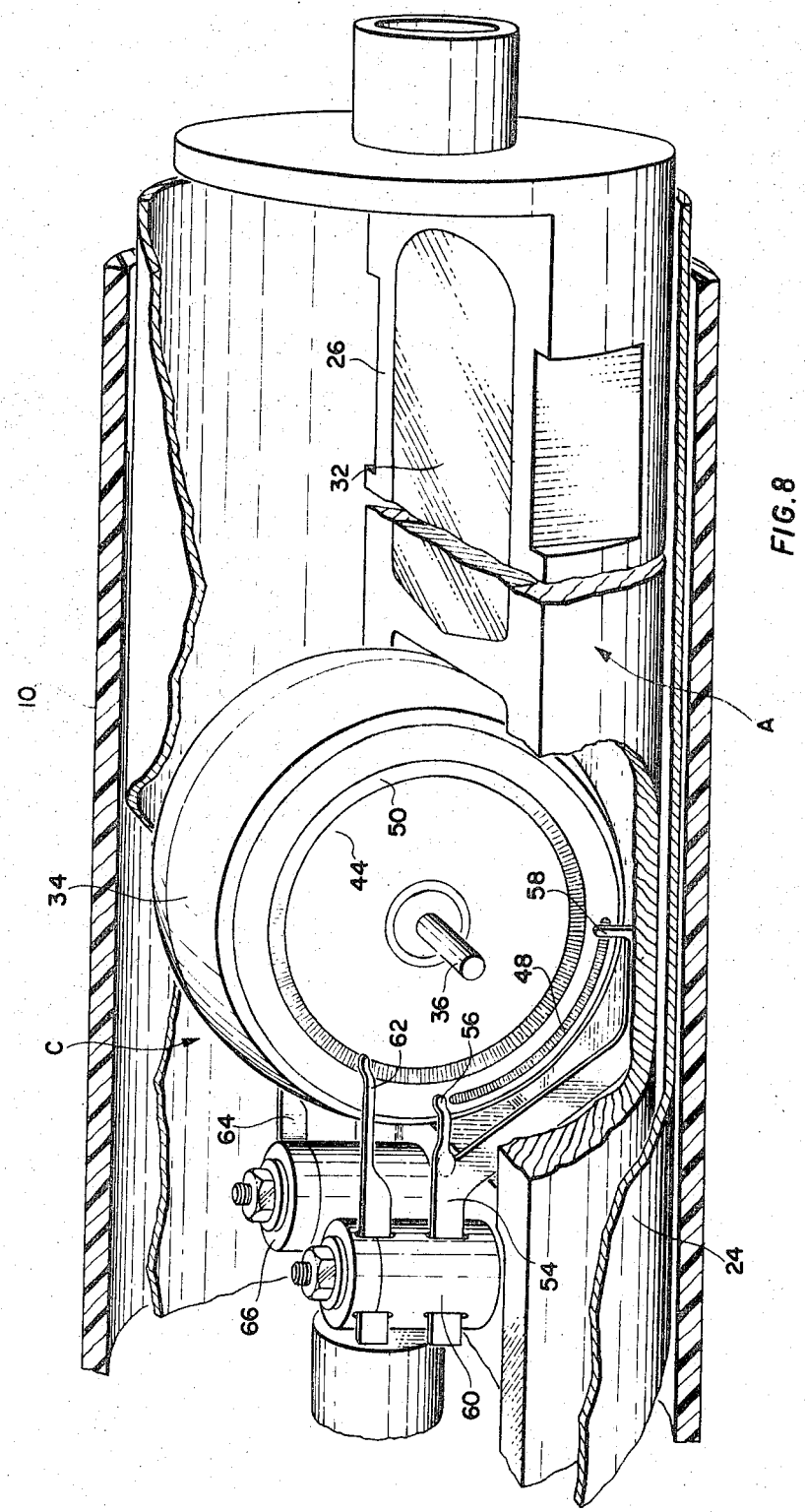
FIG. 8 is a cut away perspective illustration of the first pendulum portion of the device.
Figure 11:
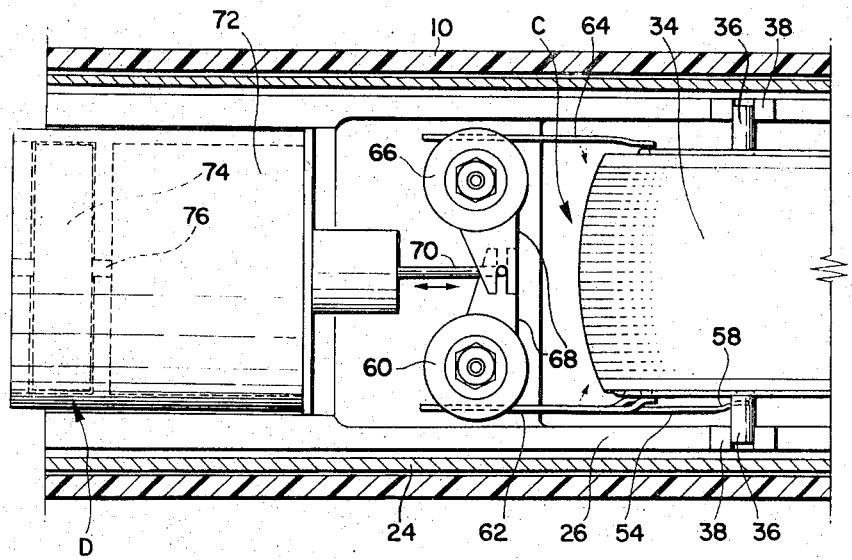
FIG. 11 is a top plan view, partially cut away, of both pendulums, and their associated mechanism.

As shown in FIGS. 8 and 11, the components A, B, C and D of the device are all contained within an inner liner sleeve 24 which may be hermetically sealed prior to insertion into the casing 10 to ensure reliable operation at all depths.

Within the sleeve 24, the carrier frame A comprises a freely rotatable instrument housing means or body 26 which is freely rotatably mounted by means of ball bearing races one of which is shown as 28. The outer shells of the bearings 28 are mounted in the interior of the sleeve 24. Dealing now with the carrier frame or body 26, it will be noted that it is of essentially semi-cylindrical shape along most of its length, and is provided at each end with bearings support means (not shown for the sake of clarity), adapted to make a good and tight fit with the inner races of bearings 28. In this way, the body member 26 is freely rotatable about the longitudinal axis of the sleeve 24 which lies on the X-axis of the device.

Preferably, the body member 26 or at least a major portion of its length is hollowed out in a generally semi-cylindrical manner, and is filled with any suitable heavy material such as lead, as at 32. Obviously, other metals or materials having sufficient mass can be substituted in place of the lead weight 32, although in fact lead has been found to be perfectly satisfactory for the purposes of this device. Clearly, the location of the lead weight in relation to the central rotational axis (the X-axis) of the body 26 is preferably such that the centre of gravity of the lead weight is sufficiently offset from such central X-axis that the lead weight acts as a pendulum, swinging about the X-axis, and, at any angular location of the device, other than at or close to the vertical, the effect of the lead weight will be cause the body member 26 to swing, level within the sleeve 24 and casing 10, into a predetermined reference orientation which it will always adopt and maintain regardless of movement of the casing 10.

Figure 9:
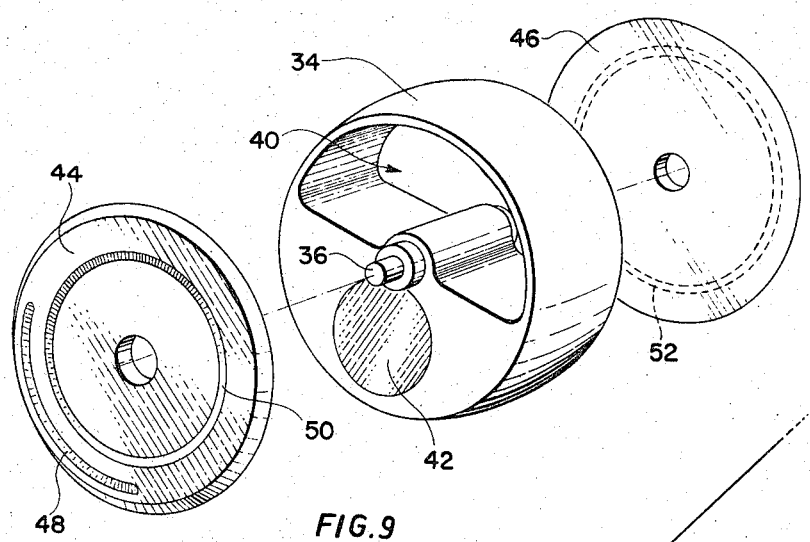
FIG. 9 is an exploded view of the pendulum as shown in FIG. 8 shown in isolation.

In order to sense the inclination of the instrument within the bore hole at any particular location the inclination pendulum unit C comprises the pendulum means 34 (shown in isolation in FIG. 9) the pendulum means being in the form of a wheel-like member mounted on a central axis 36 extending out from either side thereof and running in bearing means 38 (FIG. 11). The bearing means 38 are themselves formed integrally with the carrier frame or body 26, and it will thus be seen that the rotational axis of the pendulum 34, which extends along the central axis of the axle 36 is transverse to the rotational axis of the carrier frame or body 26. The pendulum 34 is preferably in the form of a flat sided disc, as shown in FIG. 9, with the interior of one half portion of the disc hollowed out as at 40, the remaining one half portion of the disc being substantially solid metal. In this way, the centre of gravity of the pendulum 34 is offset to one side of the axle of spindle 36. Preferably, in order to still further increase the weight of the solid portion of the disc, a core 42 of lead or other similar heavy metal may be added, in a suitable opening cut through the pendulum 34 is shown in FIG. 9 and the pendulum 34 may be formed of plastic or light weight material to still further increase its sensitivity. On either side of the disc are provided circular support plate members 44 and 46, which may be fastened to the pendulum 34 by any suitable means such as hard solder, adhesive or the like.

In order to sense the position of the pendulum 34 at any inclination of the device in a bore hole, whether it be substantially vertical, or inclined or even horizontal or directed upwardly, electrical sensing means are provided extending around 90° of arc of the periphery of the disc 44. This electrical sensing means comprises arcuate electrical coil 48, arranged and supported in the disc 44 around an arcuate path concentric with the rotational axis of the pendulum 34. Coil 48 is in the form of a length electrical coil having two ends, which are spaced apart by 90° of arc, the coil extending from one end to the other in an arcuate manner as shown in FIG. 8. The coil 48 in fact performs as a potentiometer, and is energized by means of a predetermined voltage difference impressed across the two ends of the coil. A voltage is supplied to the two ends of the coil 48 by means of the two annular contact rings 50 and 52, mounted respectively on discs 44 and 46 as shown in FIG. 8. Contact rings 50 and 52 are connected to the two ends of the coil 48 by any suitable means (not shown).

According to the invention the position of the pendulum is to be sensed by applying electrical probe means to 52 are connected to the two ends of the coil 48 by any suitable means (not shown). contact the coil 48, in the manner of a potentiometer, and at the same time electrical probe means are similarly applied to the two contact rings 50 and 51 to apply a predetermined voltage difference across the coil 48.

It is of course most desirable from the point of view of the invention that the pendulum 34 should be free as far as possible of any frictional forces which might restrict or hinder a free swinging thereof, and thereby reduce its sensitivity.

In order to ensure minimum friction of the pendulum the invention therefore provides that the electrical probe means used are movable to and fro into and out of contact with their respective coil means 48 and contact rings 50 and 52 in order that while the probe means are not in contact, then the pendulum 34 may be free to swing. In order to achieve this mode of operation, movable electrical probe means are provided. Thus the electrical probe means for contacting the coil 48 will be seen from FIG. 8 and 11 to comprise the movable probe arm 54, which is provided with two separate electrical probe contacts 56 and 58, which are offset from one another by 90° of arc. The probe arm 54 is mounted on the rotatable boss 60, which may be swung to and fro about a very limited arc whereby to bring the probe contact 56 and 58 into and out of contact with the coil 48.

In order to energize the coil 48, two further electrical probe contacts are provided in the form of probe arms 62 and 64 mounted respectively on rotatable hose 60 and rotatable boss 66.

Bosses 60 and 66 may be swung to and fro by any suitable means such as the electro mechanical means shown for example in FIGS. 8 and 11. Thus the two bosses 60 and 66 are connected by means of operating levers 68, which overlap one another and are slotted to accommodate the push-pull rod 70. The rod 70 may be moved to and fro by any suitable electrical means such as the solenoid 72. Alternatively, the operation of the probe may be effected by means of endwise extensions of the probes, and a electromagnet mounted transversely with respect to the X-axis of the device, the magnetic field of which is applied directly to the probes and simply draws them together or apart (the latter form of operation being omitted from the drawings for the sake of clarity).

It will thus be seen that so long as the probes are free of contact with their respective contact means 48, 50 and 62, the pendulum 34 is free to swing, virtually without any frictional restriction whatever apart from that present in the bearings 38 themselves. Clearly, according to modern techniques bearings such as 38 can be made which operate in a virtually frictionless manner, and if necessary, may be jewelled as in a watch movement to still further reduce the friction. In this way, it is possible to provide a pendulum 34 of extreme sensitivity which will give a very accurate indication of any inclination of the instrument, and, when the pendulum 34 is at rest, the probe means may be operated, thereby sensing the precise position of the pendulum and thereby giving a very accurate determination of the inclination of the device in a bore hole.

In most bore holes, where there is any appreciable degree of inclination from the vertical, the carrier frame A will always swing, substantially in the manner of a pendulum, with the lead weight portion 32 lowermost. In this way, the Y-axis, i.e., the axis of the axle of spindle 36 of the pendulum 34 will in almost all cases lie in a horizontal plane. Consequently, the inclination sensed by the pendulum 34 will almost always be the true inclination. However, in certain locations in a bore hole where it is almost vertical then the carrier frame A may not be sufficiently sensitive to swing into the correct position, and may rotate into any position without reference to gravity. Where this may occur, then the reading of the pendulum 34 may in fact be somewhat in error. In order to avoid these errors, an additional reference pendulum D is included in the device. The pendulum D is essentially in all respects similar to the pendulum C. The only noticeable difference will be that the pendulum unit D will comprise a pendulum 74 mounted on a central spindle 76 which lies on the X-axis of the device, i.e., along the longitudinal axis, nd res The only noticeable difference will be that the pendulum D will comprise a pendulum 74 mounted on a central spindle 76 which lies on the X-axis of the device, i,e, along the longitudinal axis, and of course the same axis as that about which the carrier frame frame A is adapted to rotate. However, the pendulum 74, may be mounted in much more sensitive bearings (not shown) which may if desired be jewelled bearings, and is therefore very much more sensitive to even any small degrees of inclination, than is the carrier frame A. The pendulum 74 is provided with electrical coil means and electrical contact ring means in the same way as the pendulum 34, which may be contacted by means of movable probe means (not shown) similar to the probe means used in connection with the pendulum 34. In this way, the pendulum 74 may be made extremely sensitive to very small deviations from the vertical, and any difference detected between the position of the pendulum 74, and the position of the carrier frame A on which it is mounted, will then be noted, and suitable compensation can be included in any calculations of the actual inclination at that point in the bore hole.

It will of course be understood that the various details and operation of the reference pendulum unit D have not been discussed in any great detail since they are essentially similar to the operation and mechanisms in relation to the inclination pendulum unit C. This the pendulum 74 is made up essentially the same as the pendulum 34 as shown n FIG. 9 although on a somewhat smaller scale. It is provided with an electrical contacting coil, acting as a potentiometer, and two electrical contact rings, and movable probes, arranged by a suitable mechanism (not shown) to move into and out of contact with the contact rings and coil, operated by the solenoid 72, or any other suitable mechanical or magnetic means.

The azimuth, or compass bearing of the instrument is determined by means of the gyro unit B which is in function essentially similar to an inertial guidance system. That is to say, the gyro unit B incorporates a power operated gyro, operated either electrically or by high pressure gas or any other system known in the art, the details of which do not require further discussion. The gyro is mounted so that its spin axis will be maintained horizontal at all positions which the device itself may adopt, whether in a vertical orientation or horizontal or pointing at an angle upwardly or downwardly. According to known principles, the spin axis of the gyro is established in a predetermined direction, i.e., true north, and will remain pointing in that direction regardless of movement of the device. All that is then required is to sense any deviation of the device about an axis located at 90° to the spin axis of the gyro, in order to determine the actual bearing along which the device is directed.

According to the invention, these functions are achieved by providing a gyro mounted in what is in effect a multiple gimbals, the outer two portions of which are weighted so as to maintain respectively a horizontal position and a vertical position regardless of movement of the device as a whole. In this way, the inner portions of the gimbals will remain free to swing about an axis which will remain vertical regardless of movement of the instrument, thereby leaving the gyro itself free to maintain its reference bearing at all times.

These features are shown in FIGS. 5, 6 and 7, and may be most readily understood with reference to FIGS. 3 and 4. Referring now to FIG. 5, it will be seen that the gyro unit B is mounted at the lower end of the carrier frame or body 26. It will be recalled that the carrier frame 26 is itself freely rotatable about the longitudinal axis, the X-axis of the device, and that the carrier frame 26 is weighted by the lead weight 32 so as to remain in a predetermined orientation, with the Y-axis lying in a horizontal plane, regardless of rotational movement of the outer casing 10 of the device. Thus it will be seen that the carrier frame or body 26 in fact functions as the outer most portion of a gimbals system for the gyro unit B.

The next portion of the gimbals system is provided by means of the spherical shaped outer shell 78, which is mounted by stub axles 80 located on either side thereof, for swinging about the Y-axis relative to the carrier frame 26. The shell 78 is made in two halves, and is provided with upper and lower bearings 82 for purposes to be described.

The next portion of the gimbals system comprises an intermediate shell 84, which is also spherical in shape, and formed in two halves. The shell 84 is rotatably mounted in the bearings 82 of the shell 78 by means of the pivot pins 85, and is therefore rotatable about the Z-axis.

The innermost portion of the gimbals system comprises the inner shell 86, which is partially spherical in shape, and is rotatably mounted by pivot pins 87 inside shell 84. Pivot pins 87 are located in FIGS. 5, 6 and 7 along the X-axis of the device, although clearly this will not remain in such alignment during operation. Within the inner shell 86 the gyro G itself is mounted for rotation about its spin axis S, the details of the gyro and its spin axis having been omitted from FIG. 5 since they are essentially well known in the art and do not require further description. In fact, the entire shell 86 and gyro G contained therein are obtained from an inertial guidance system, and may be, as stated, either electrically powered or powered by high pressure gas or the like as is well known in the art. One form of such a gyro unit which has been found suitable for the purposes of this invention is manufactured by Honeywell Government and Aeronautical Products Division.

In order to maintain the shell 78 with its Z-axis in a vertical orientation at all times, a weight means 88 is attached on the lower half of the shell 78. Preferably, the weight means 88 is formed of lead, or any other suitable material of a high specific gravity, and may for example even be made of gold, where still greater weight is required within the relatively confined space available.

In order to sense the position of the shell 84 relative to the shell 78, use is made of essentially the same principle as is employed in connection with the sensing of the pendulums 34 and 74. Thus an electrical contact coil 90 extends around the surface of the shell 84, and is connected at its two ends, (not shown) to a suitable source of electrical potential, whereby to impress a predetermined voltage difference across the coil 90. A probe member 92 is provided on the interior of the shell 78, and is in contact with the coil 90. Preferably, the probe 92 is of a suitable resilient material such as a flexible copper strip the end of which may be silver, or provided with any other suitable means to minimize friction between the probe 92 and the coil 90. The coil 90 and the probe 92 function as an electrical potentiometer, in the same way as coil 48 on pendulum 34, the only difference being that the probe 92 is permanently in contact with the coil 90 and is not movable to and fro.

In order to supply electrical power to the gyro within the shell 86, and also in order to supply an electrical potential to the coil 90, and to receive the potential determined by the probe 92, a series of movable contacts are provided on the shell 78. Thus shell 78 has six electrical contact rings 94 which are concentric with one another, all of them being centred on the Y-axis about which the shell 78 is free to swing as described above. Six flexible contact fingers or probes 96, connected by any suitable mounting means (not shown) to the carrier frame 26. The probes 96 are permanently in contact with the contact rings 94, and are preferably made of thin flexible material, which may be provided with silver tips for reducing friction.

The electrical circuits extending between shells 78, 84 and 86 for passing current to the gyro may be made through the pivots 85 and 87. Similarly, the electrical connection between the coil 90 on shell 84 and the appropriate contact ring 94 on shell 78 will also be made by any appropriate means through a bearing 82, and a pivot pin 85.

Figure 10:
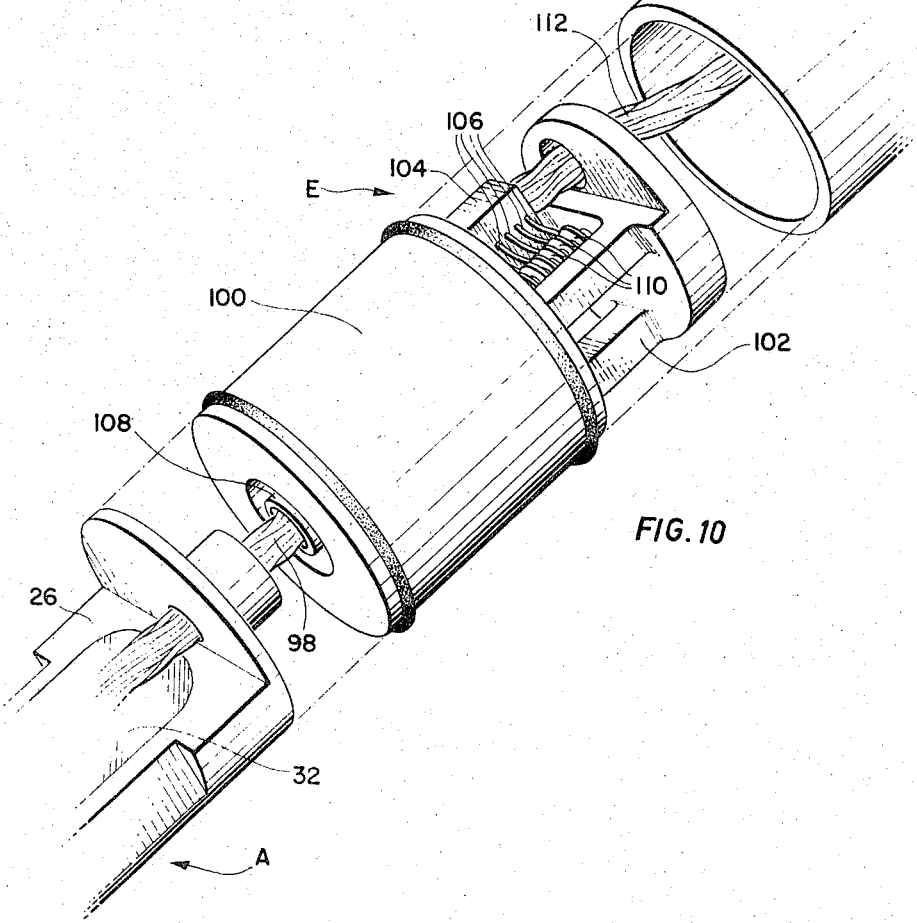
FIG. 10 is an exploded perspective illustration of the slip ring electrical contact portion of the device.

It will of course be noted that the probes 96 are connected by any suitable wiring indicated at 98 extending along the length of the carrier frame 26. Clearly, the two pendulums 34 and 74, and the solenoid 72 must all be operated, controlled and sensed electrically as described and the wiring for all of these various members must all be carried up the carrier frame 26 to its upper end. At the upper end of the carrier frame 26 there is provided a slip ring contact assembly referenced as E, details of which are shown in FIG. 10. Referring now to FIG. 10, the slip ring assembly E will be seen to comprise an outer sleeve 100, which is adapted to fit snugly within the outer casing 10, and a fixed framework 102 adapted to fit snugly within the sleeve 100. The frame 102 supports an electrical connector block 104, having a series of electrical contact arms 106 extending therefrom.

A hollow rotatable shaft 108 is provided at its upper end with a plurality of slip ring contacts 110, adapted to register with respective contact arms 106, and to be rotatable relative thereto. The electrical wiring 98, coming from the carrier frame 26 passes through the rotatable shaft 108, and individual wires are connected to individual slip rings 110. A further bundle of cables 112 is connected to the connection block 104.

Within the upper end 14 of the device, a suitable source of electrical power such as series of dry cells or the like may be provided for the gyro B, and signal amplifiers may be provided for amplifying signals from the various components, for transmitted to the instrumentation I on the earths surface, through the cable 18. The details of such power supply, amplifiers, and other electrical circuitry as may be contained within the upper end 14 are not described herein for the sake of clarity. It will however of course be understood that the bundle of electrical wires 112 will be connected to the appropriate circuits and the like within the upper end 14.

Figure 12:
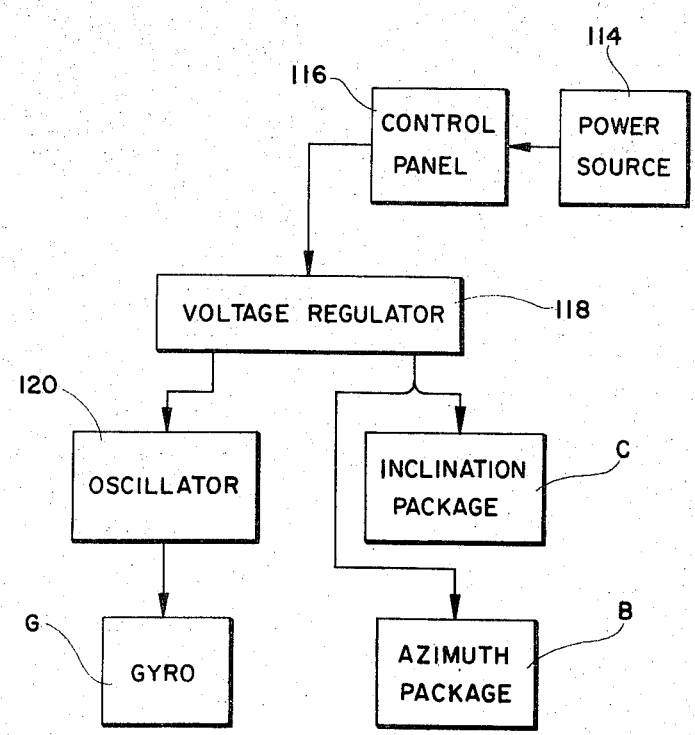
FIG. 12 is a schematic block circuit diagram of the device.

The general electrical arrangement of the device is shown in the block circuit diagram of FIG. 12 wherein a power source 114 may be connected through a suitable control panel at the surface 116, and a voltage regulator 118. The voltage regulator is such as to provide two different voltages, one voltage going to the oscillator 120, and thence to the gyro G, and the other voltage going to the pendulum unit C (described in the block diagram as an inclination package) and also going to the azimuth coil in the gyro unit B.

In operation the entire device is lowered down a bore hole by means of a suitable hoist, and at a predetermined depth down the bore hole the device is brought to a standstill, and a predetermined delay is allowed for oscillation of the pendulums 34 and 74, and for stabilization of the carrier frame 26, and the gimbals supporting the gyro B. The operator, by means of circuits in the instrumentation I will then deliver a triggering signal to the solenoid 72, thereby bringing the electrical probes 54, 62 and 64 into contact with the coil 48 and the contact rings 50 on the pendulum 34, and similar probe means into contact with similar coils and contact rings on the pendulum 74. As soon as the probes come into contact with their respective rings on the pendulums, a predetermined voltage differential is impressed across the two ends of the coil, which is so designed that at exactly one half way around the coil the electrical potential which can be detected by the probe will be zero. The detection of any electrical potential in the coil 48, in accordance with well known principals applicable to potentiometers, will thus be proportional from the distance of the probe away from the centre of the coil, and this therefore gives a very accurate reading of the inclination of the pendulum 34 relative to the carrier frame 26.

Assuming that the bore hole has anything more than a very slight inclination, then the carrier frame 26 will swing so that the weight 32 is lowermost, therefore bringing the Y-axis of the gyro unit B into the horizontal. The weight 88 will of course inturn bring the Z-axis of the gyro unit vertical. The gyro itself will always maintan a predetermined reference heading which has been preset prior to insertion down the bore hole, and thus any deviation of the device as a whole from the original heading will be detected by a movement of the coil 90 relative to the probe 92. The coil 90 being in effect a potentiometer will therefore show an electrical potential proportional to the distance of the probe 92 from the midway point in the coil 90, and thereby giving an accurate reading of a deviation from the original heading.

All of this information will be read out on the instrumentation I, and having been recorded either automatically or by hand, the solenoid 72 can then be deactivated, thereby releasing the probes from their pendulum, and leaving the pendulums free to swing independently once more. The device can then be lowered to a further station down the bore hole and a further reading taken. It will not be necessary to withdraw the device in the bore hole each time a reading is taken since all of the information required can be obtained from the device without any requirement for resetting any instruments within its interior or in fact touching it in any way at all. In fact, it will be found that by the practice of the invention very deep bore holes can be logged completely while the device 10 is descending, and if desired check readings can be taken while it is being wound up to the surface once more, and a complete set of descent and ascent readings can be taken off in a matter of an hour or so, as compared with prior art instruments which might take several days or even as much as a week in the case of very deep bore holes for an equivalent number of readings, and without anything like the same degree of accuracy as could be obtained with the present invention.

In addition, it will be noted that the device according to the present invention is fully operative even when the bore hole is absolutely perpendicular, or when it is absolutely horizontal. As shown in FIG. 4, when all of the components are vertical the Z-axis of the gyro and the X-axis of the device will coincide and the gyro is therefore irrelevant. The inclination pendulum C will indicate that the device is perpendicular, and the reference pendulum D will give no reading whatever. It will of course be understood that the carrier frame 26, when the device is in a vertical or perpendicular orientation as shown in FIG. 4, is ineffective, and therefore the information concerning the azimuth or bearing which is obtained from the gyro will be inaccurate. However, this is immaterial to the practice of the present invention, since, having received an indication from the inclination pendulum C that the device is located perpendicular, then there can be no requirement for an azimuth bearing at all. A bore hole which is perpendicular clearly does not have any "azimuth" or bearing, and therefore there is no need for the operator to obtain an azimuth reading from the device in this position.

When the device is located horizontal, as shown in FIG. 3 then the gyro B and the inclination pendulum C work exactly as described above. It will of course be understood that the device can be employed in bore holes which incline upwardly ather than downwardly, the only difference being that it will be necessary to attach the device on the end of successive lengths of drill rods, rather than simply lower it on the end of a cable.

It will of course be understood that notwithstanding the fact that the inclination sensing coil 48 extends only around 90° of arc, it is nevertheless possible to sense the inclination of the device over an extent of 180° i.e., vertically down to vertically up. This is made possible by the fact that there are two separate contacts 56 and 58 on the single probe arm 54, while of course only one of the two contacts 56 or 58 can be in contact with the coil 48 at any one time. It will therefore be understood that when taking the inclination reading in a bore hole, all that the operator will have to know is whether the bore hole is directed in a generally upwardly direction or a generally downward direction, and then take off the readings as being either below horizontal or above horizontal.

While the foregoing embodiment of the invention has been described with reference to a comprehensive instrument providing both azimuth and inclination readings in all types of bore holes, it will of course be understood that the invention can be used in circumstances where all that is required is an inclination reading at intervals down a bore hole. In such cases, the instrument can be very much simplified and made up simply by omitting altogether the gyro unit B and its associated instrumentation. Such an instrument will therefore only have the movable platform A, the inclination pendulum C, and the reference pendulum unit D and can thus be made somewhat shorter, if desired, and very much cheaper and simpler to operate. Such simplified forms of the invention have important industrial applications and are considered being within the scope of this invention without requiring separate illustration or description.

The foregoing is a description of a preferred embodiment of the invention which is given here by way of example only. The invention is not to be taken as limited to any of the specific features described but comprehends all such variations as come within the scope of the appended claims.

What we claim is:

1. A bore hole logging device of the type which is intended to be introduced into a bore hole, and passed therealong to determine the attitude of the bore hole at spaced intervals, without repeatedly withdrawing the device from the bore hole to obtain readings at each station therealong, said device comprising:

casing means adapted to be attached to means such as a cable, drill rods or the like, said casing defining a longitudinal axis;

mounting means movably located within said casing, and being rotatable about said longitudinal axis of said casing freely and independently of movement of said casing, said mounting means being constructed and weighted to define a centre of gravity thereof offset with respect to said longitudinal axis, whereby to bias said mounting means into a predetermined orientation with respect thereof when said longitudinal axis is appreciably inclined relative to the vertical;

inclination pendulum means mounted on said mounting means, said pendulum means being swingable about a swing axis transverse to said longitudinal axis of said device, and so located that said swing axis of said pendulum is normally located horizontal when said mounting means is located in said predetermined orientation;

sensing means associated with said inclination pendulum for sensing the inclination thereof relative to said mounting means, thereby to determine the inclination of said logging device within a bore hole;

secondary reference pendulum means mounted on said mounting means, and swingable about a swing axis coincident with the longitudinal axis of said device, and sensing means for sensing the position thereof with reference to said mounting means, thereby to provide a check on the rotational position of said mounting means.

2. A bore hole logging device as claimed in claim 1 wherein said mounting means consists of an elongate body of generally semi-cylindrical shape along a major portion of its length, and recess means formed therein for reception of a portion of said pendulum therein in freely swingable relationship thereto, and including bearing means located spaced apart along said body, and fitting within said casing means whereby to mount said body within said casing means in freely rotatable relation thereto.

3. A bore hole logging device as claimed in claim 1 wherein said mounting means comprises an elongate body of predetermined density and specific gravity, and weight means incorporated in said body of greater specific gravity than said body, said weight means being offset with respect to said longitudinal axis of rotation of said mounting means.

4. A bore hole logging device as claimed in claim 1 wherein said pendulum comprises a generally cylindrically shaped body, said swing axis of said pendulum being located along the central axis of said cylindrical shaped body, said cylindrical shaped body being weighted and constructed so as to define a centre of gravity thereof which is offset with respect to said swing axis.

5. A bore hole logging device as claimed in claim 1 wherein said sensing means includes an electrical conductor member of arcuate shape, mounted on one side of said pendulum, concentric with the swing axis thereof, and electrical connection means connected to each end of said conductive member, forming the same into a potentiometer, and means for contacting and releasing said conductor member whereby to sense the inclination of said pendulum as aforesaid.

6. A bore hole logging device as claimed in claim 1 including electrically operable contact arm means forming part of said sensing means, and operable to swing into and out of contact with said pendulum.

7. A bore hole logging device of the type which is intended to be introduced into a bore hole, and passed therealong to determine the attitude of the bore hole at spaced intervals, without repeatedly withdrawing the device from the bore hole to obtain readings at each station therealong, said device having a longitudinal X axis and transverse Y and Z axes perpendicular to one another and comprising;

casing means adapted to be attached to means such as a cable, drill rods or the like, said casing defining said longitudinal X axis;

mounting means movably located within said casing, and being rotatable about said longitudinal axis of said casing freely and independantly of movement of said casing, said mounting means being constructed and weighted to define a centre of gravity thereof offset with respect to said longitudinal X axis, whereby to bias said mounting means into a predetermined orientation with respect thereof when said longitudinal X axis is appreciably inclined relative to the vertical;

inclination pendulum means mounted on said mounting means, said pendulum means being swingable about a swing axis transverse to said longitudinal X axis and parallel to said Y axis of said device, and so located that said swing axis of said pendulum is normally located horizontal when said mounting means is located in said predetermined orientation;

inclination sensing means associated with said pendulum for sensing the inclination thereof relative to said mounting means, thereby to determine the inclination of said logging device within a bore hole;

gyro means mounted on said mounting means, and adapted to maintain a constant orientation regardless of movement thereof;

gimbal bearing means supporting said gyro means on said mounting means, whereby said gyro may maintain said constant orientation in all positions of said device;

azimuth sensing means associated with said gyro means for sensing deviation of the aximuth of said mounting means relative to said gyro means;

secondary reference pendulum means mounted on said mounting means, and swinging about a swing axis coincident with the longitudinal axis of said device, and, sensing means for sensing the position thereof with reference to said mounting means, thereby to provide a check on the rotational position of said mounting means.

8. A bore hole logging device as claimed in claim 7 wherein said mounting means consists of an elongate body of generally semi-cylindrical shape along a major portion of its length, and recess formed therein for reception of a portion of said pendulum therein in freely swingable relationship thereto, and including bearing means located spaced apart along said body, and fitting within said casing means whereby to mount said body within said casing means in freely rotatable relation thereto.

9. A bore hole logging device as claimed in claim 7 wherein said mounting means comprises an elongate body of predetermined density and specific gravity, and weight means incorporated in said body of greater specific gravity than said body, said weight means being offset with respect to said longitudinal axis of rotation of said mounting means.

10. A bore hole logging device as claimed in claim 7 wherein said pendulum comprises a generally cylindrically shaped body having a central axis concentric therewith and wherein said swing axis of said pendulum is located along the central axis of said cylindrically shaped body being weighted and constructed so as to define a centre of gravity thereof which is offset with respect to said swing axis.

11. A bore hole logging device as claimed in claim 7 wherein said inclination sensing means includes an electrical conductor member of arcuate shape, mounted on one side of said pendulum, concentric with the swing axis thereof, and electrical connection means connected to each end of said conductive member, forming the same into a potentiometer, and means for contacting and releasing said conductor member whereby to sense the inclination of said pendulum as aforesaid.

12. A bore hole logging device as claimed in claim 7 including electrically operable contact arm means forming part of said inclination sensing means, and operable to swing into and out of contact with said pendulum.

13. A bore logging device as claimed in claim 7 wherein said reference pendulum means is swingable about a swing axis coincident with the longitudinal X axis of said device sensing means associated with said reference pendulum means for sensing the inclination thereof relative to said mounting means, thereby to provide a check on the rotational position of said mounting means.

14. A bore hole logging device as claimed in claim 7 including an outer gimbal shell means rotatably mounted on said mounting means for swinging about the Y axis transverse to the longitudinal X axis of said device, and being weighted whereby to define a centre of gravity thereof which is offset with respect to said rotational axis of said outer shell, whereby to bias said outer shell into a predetermined orientation about its said rotational axis;

intermediate shell means within said outer shell means rotatably mounted therein for swinging about the Z axis perpendicular to the longitudinal X axis and the transverse Y axis of said device;

sensing means within said outer shell means for sensing swinging movement of said intermediate shell means about said Z axis relative to said outer shell means, and, inner shell means rotatably mounted within said intermediate shell means for swinging about an axis coincident with the longitudinal X axis of said device, when said intermediate shell means is rotated to bring said inner shell axis into coincidence therewith, said gyro means being supported within said inner shell means.

15. A bore hole logging device as claimed in claim 14 including electrical conductor members located around the exterior of said outer shell, and contact means mounted on said mounting means and extending into contact therewith.

16. A bore hole logging device as claimed in claim 14 including electrical conductor means located around said intermediate shell means concentrically with said Z axis of rotation thereof, said sensing means on said outer shell means contacting said conductor means for sensing the position thereof.

* * * * *